United States Patent
Chae et al.

(10) Patent No.: US 10,631,348 B2
(45) Date of Patent: Apr. 21, 2020

(54) METHOD AND APPARATUS FOR SELECTING RELAY BY DEVICE-TO-DEVICE COMMUNICATION TERMINAL AND TRANSMITTING OR RECEIVING SIGNAL IN WIRELESS COMMUNICATION SYSTEM

(71) Applicant: LG ELECTRONICS INC., Seoul (KR)

(72) Inventors: Hyukjin Chae, Seoul (KR); Hanbyul Seo, Seoul (KR); Hakseong Kim, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 51 days.

(21) Appl. No.: 15/564,292

(22) PCT Filed: Apr. 21, 2016

(86) PCT No.: PCT/KR2016/004173
§ 371 (c)(1),
(2) Date: Oct. 4, 2017

(87) PCT Pub. No.: WO2016/171495
PCT Pub. Date: Oct. 27, 2016

(65) Prior Publication Data
US 2018/0139794 A1 May 17, 2018

Related U.S. Application Data

(60) Provisional application No. 62/150,839, filed on Apr. 21, 2015, provisional application No. 62/151,396, (Continued)

(51) Int. Cl.
*H04W 76/14* (2018.01)
*H04W 40/12* (2009.01)
(Continued)

(52) U.S. Cl.
CPC ........... *H04W 76/14* (2018.02); *H04W 8/005* (2013.01); *H04W 40/12* (2013.01); *H04W 40/24* (2013.01);
(Continued)

(58) Field of Classification Search
CPC ..... H04W 8/005; H04W 40/12; H04W 40/24; H04W 40/246; H04W 56/00;
(Continued)

(56) References Cited

U.S. PATENT DOCUMENTS

2010/0261469 A1  10/2010 Ribeiro et al.
2012/0265818 A1  10/2012 Van Phan et al.
(Continued)

FOREIGN PATENT DOCUMENTS

| KR | 10-2014-0073346 A | 6/2014 |
| WO | WO 2015/046985 A1 | 4/2015 |
| WO | WO 2015/047167 A1 | 4/2015 |

OTHER PUBLICATIONS

CATT, "Design of D2DSS and PD2DSCH," 3GPP TSG RAN WG1 Meeting #78, R1-142893, Dresden, Germany, Aug. 18-22, 2014, 5 pages.

*Primary Examiner* — Khoa Huynh
(74) *Attorney, Agent, or Firm* — Birch, Stewart, Kolasch & Birch, LLP

(57) ABSTRACT

An embodiment of the present invention relates to a method for selecting a relay for device-to-device (D2D) and receiving a signal by a terminal in a wireless communication system, the method comprising the steps of: receiving a plurality of discovery signals; selecting a relay, using a quality of the plurality of discovery signals and a synchronization signal source ID; and receiving a D2D signal from the selected relay.

11 Claims, 10 Drawing Sheets

Related U.S. Application Data filed on Apr. 22, 2015, provisional application No. 62/151,448, filed on Apr. 23, 2015, provisional application No. 62/205,070, filed on Aug. 14, 2015.

(51) Int. Cl.
| | | |
|---|---|---|
| *H04W 88/02* | (2009.01) | |
| *H04W 56/00* | (2009.01) | |
| *H04W 40/24* | (2009.01) | |
| *H04W 8/00* | (2009.01) | |
| *H04W 72/04* | (2009.01) | |

(52) U.S. Cl.
CPC ......... *H04W 40/246* (2013.01); *H04W 56/00* (2013.01); *H04W 56/002* (2013.01); *H04W 88/02* (2013.01); *H04W 72/0446* (2013.01); *H04W 72/0453* (2013.01)

(58) Field of Classification Search
CPC ........... H04W 56/0015; H04W 56/002; H04W 72/0446; H04W 72/0453; H04W 76/10; H04W 76/14; H04W 88/02
See application file for complete search history.

(56) References Cited

U.S. PATENT DOCUMENTS

| | | |
|---|---|---|
| 2014/0003262 A1 | 1/2014 | He et al. |
| 2014/0066119 A1 | 3/2014 | Tavildar et al. |
| 2016/0037568 A1* | 2/2016 | Hakola ................ H04W 76/14 370/329 |
| 2016/0270012 A1* | 9/2016 | Chen .................... H04W 76/10 |

\* cited by examiner (a)

(b)

(a)

(b)

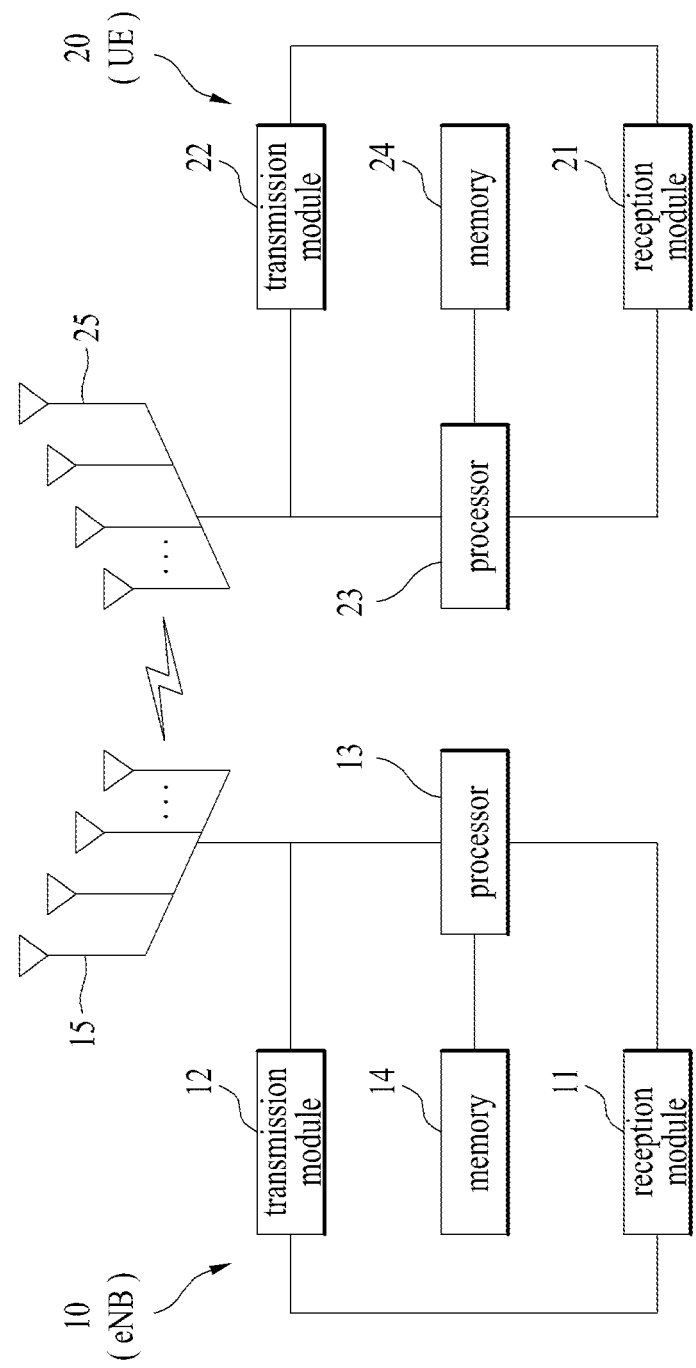

METHOD AND APPARATUS FOR SELECTING RELAY BY DEVICE-TO-DEVICE COMMUNICATION TERMINAL AND TRANSMITTING OR RECEIVING SIGNAL IN WIRELESS COMMUNICATION SYSTEM

CROSS REFERENCE TO RELATED APPLICATIONS

This application is the National Phase of PCT International Application No. PCT/KR2016/004173, filed on Apr. 21, 2016, which claims priority under 35 U.S.C. 119(e) to U.S. Provisional Application No. 62/150,839, filed on Apr. 21, 2015, No. 62/151,396, filed on Apr. 22, 2015, No. 62/151,448, filed on Apr. 23, 2015 and No. 62/205,070, filed on Aug. 14, 2015, all of which are hereby expressly incorporated by reference into the present application.

TECHNICAL FIELD

The present invention relates to a wireless communication system, and more particularly, to a method for selecting a relay in device-to-device (D2D) communication and a method and apparatus for transmitting and receiving signals to and from the selected relay.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

Device-to-device (D2D) communication means a communication scheme in which a direct link is established between user equipments (UEs) and the UEs exchange voice, data, and the like directly with each other without intervention of an evolved NodeB (eNB). The D2D communication may include UE-to-UE communication and peer-to-peer communication. In addition, the D2D communication may be applied to machine-to-machine (M2M) communication, machine type communication (MTC), etc.

The D2D communication has been considered as a solution for reducing eNB loads caused by rapidly increasing data traffic. For example, in the D2D communication, since devices can exchange data directly with each other without intervention of the eNB unlike the conventional wireless communication system, network overload can be decreased. Further, when the D2D communication is introduced, it is expected that the following effects will be achieved: simplification of processes of the eNB, reduction of power consumption of devices participating in the D2D communication, increase in data transmission rates, increase in capability of the network, load distribution, cell coverage extension, etc.

DISCLOSURE OF THE INVENTION

Technical Task

The technical task of the present invention is to provide a method for selecting a relay by considering both a synchronization cluster and a D2D signal quality.

It will be appreciated by persons skilled in the art that the objects that could be achieved with the present invention are not limited to what has been particularly described hereinabove and the above and other objects that the present invention could achieve will be more clearly understood from the following detailed description.

Technical Solutions

In an aspect of the present invention, provided herein is a method for selecting a relay for device-to-device (D2D) and receiving a signal by a user equipment (UE) in a wireless communication system, including: receiving a plurality of discovery signals; selecting a relay using qualities of the plurality of discovery signals and synchronization signal source IDs; and receiving a D2D signal from the selected relay.

In another aspect of the present invention, provided herein is a device-to-device (D2D) user equipment (UE) for selecting a relay and receiving a signal, including: a transmitting device; a receiving device; and a processor configured to receive a plurality of discovery signals, select a relay using qualities of the plurality of discovery signals and synchronization signal source IDs, and receive a D2D signal from the selected relay.

The UE may select a relay in descending order of the qualities of the discovery signals. If a relay has a synchronization signal source ID different from that of the UE, the relay may be considered to have the lowest quality.

The relay having the synchronization signal source ID different from that of the UE may belong to a different synchronization cluster.

Each of the plurality of discovery signals may include a synchronization signal source ID of a relay.

Each of the plurality of discovery signals may include resource pool information.

The UE may attempt to receive data on resources indicated by the resource pool information.

Each of the plurality of discovery signals may include transmit power information of a relay UE that transmits a discovery signal.

The UE may estimate a path loss using the transmit power information.

Each of the plurality of discovery signals may include mobility information of a relay UE that transmits a discovery signal.

The UE may de-prioritize a relay UE with high mobility using the mobility information.

Each of the plurality of discovery signals may include handover-related information of a UE that transmits a discovery signal.

The UE may detect a synchronization signal of a cell to which a relay intends to perform handover.

Advantageous Effects

According to the present invention, it is possible to select a relay while minimizing occurrence of interference.

It will be appreciated by persons skilled in the art that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 11 is a diagram illustrating configurations of transmitting and receiving devices.

BEST MODE FOR INVENTION

Figure 1:
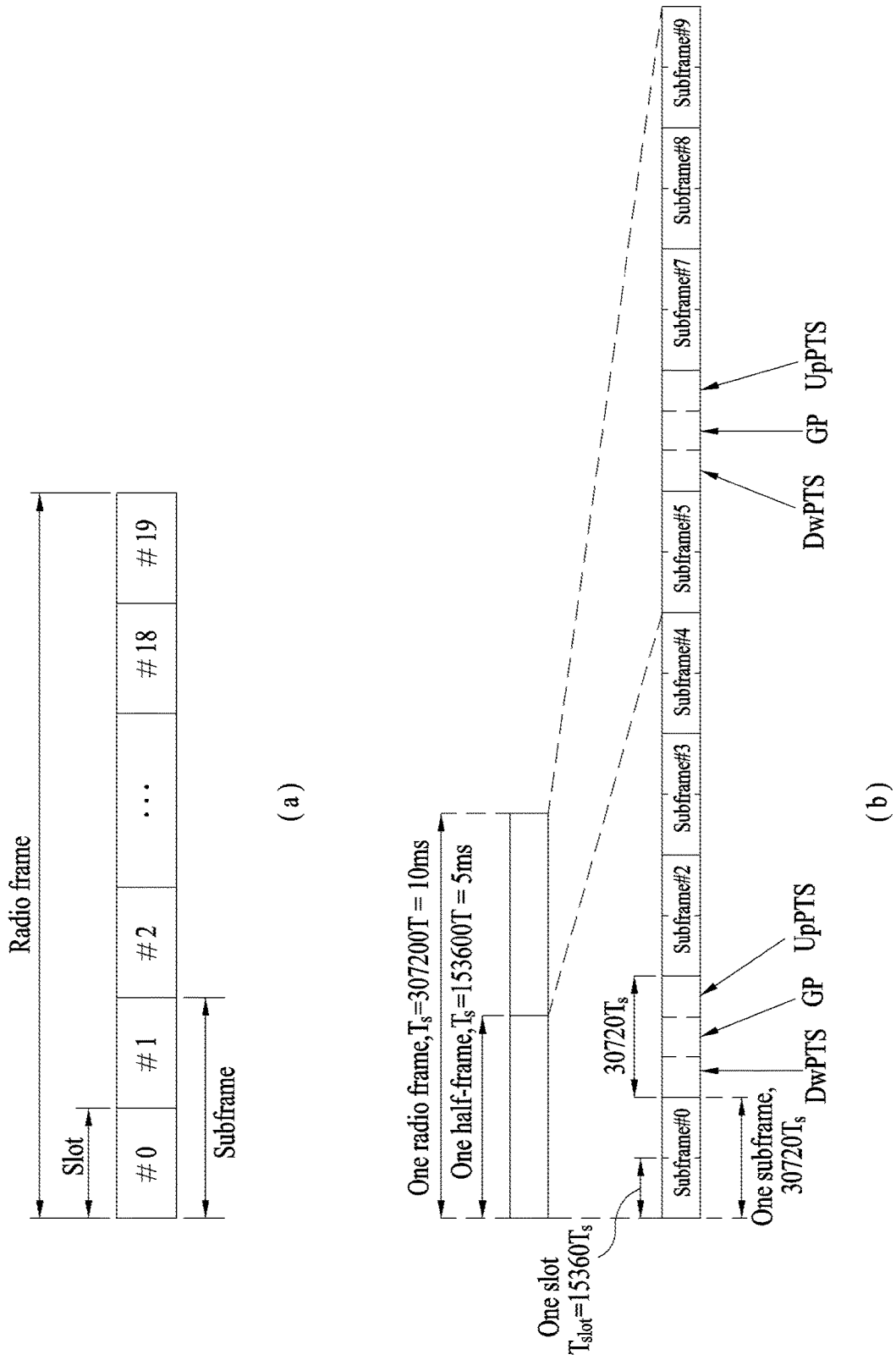
FIG. 1 is a diagram for a structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

The term "cell", as used herein, may be applied to transmission and reception points such as a base station (eNB), sector, remote radio head (RRH) and relay, and may also be extensively used by a specific transmission/reception point to distinguish between component carriers.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

With reference to FIG. 1, the structure of a radio frame will be described below.

In a cellular Orthogonal Frequency Division Multiplexing (OFDM) wireless Packet communication system, uplink and/or downlink data Packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
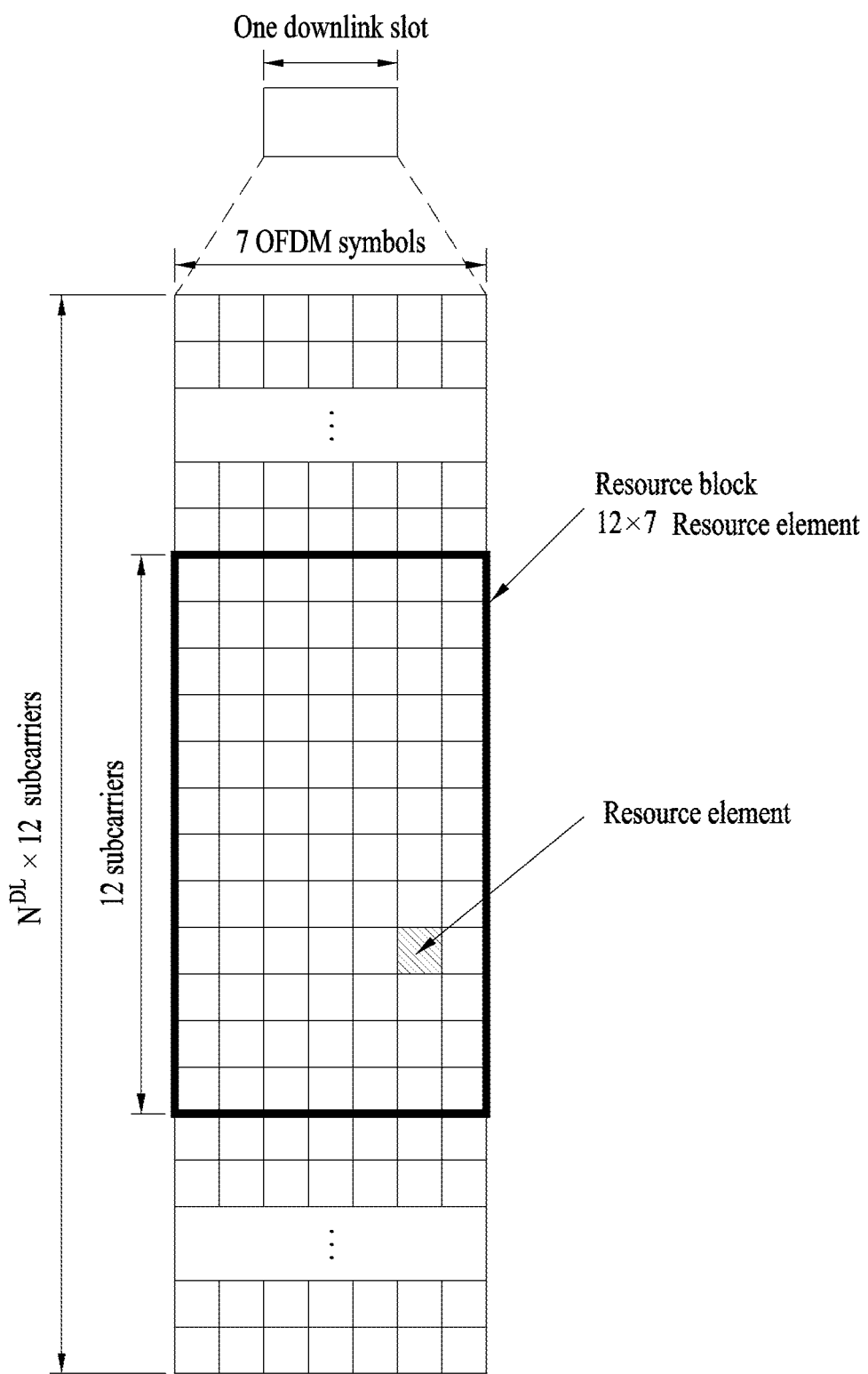
FIG. 2 is a diagram for a resource grid in a downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
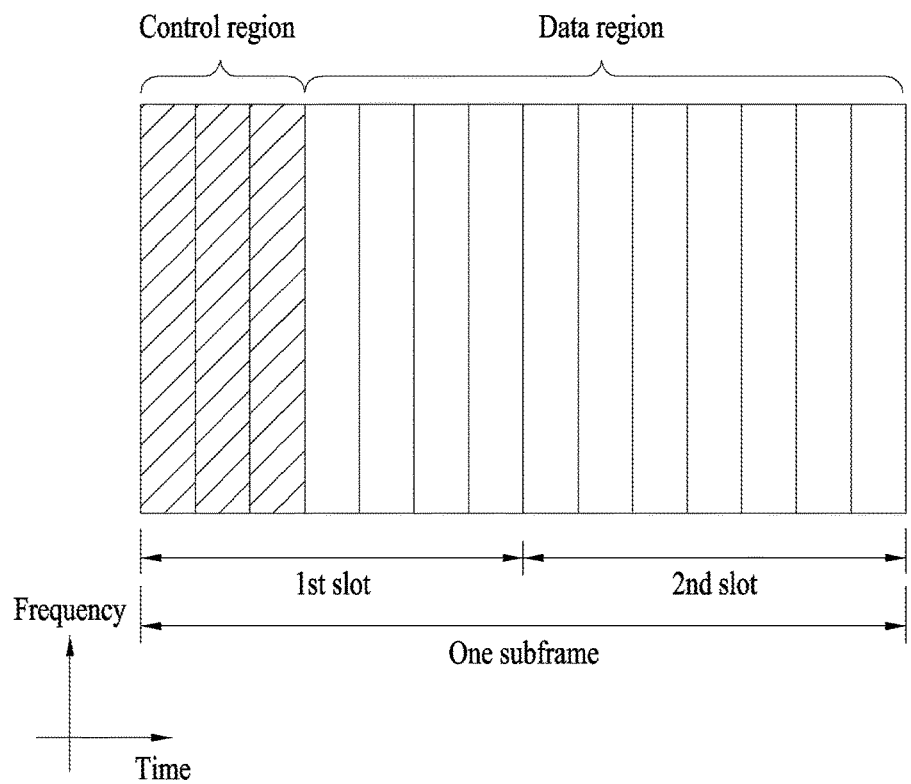
FIG. 3 is a diagram for a structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
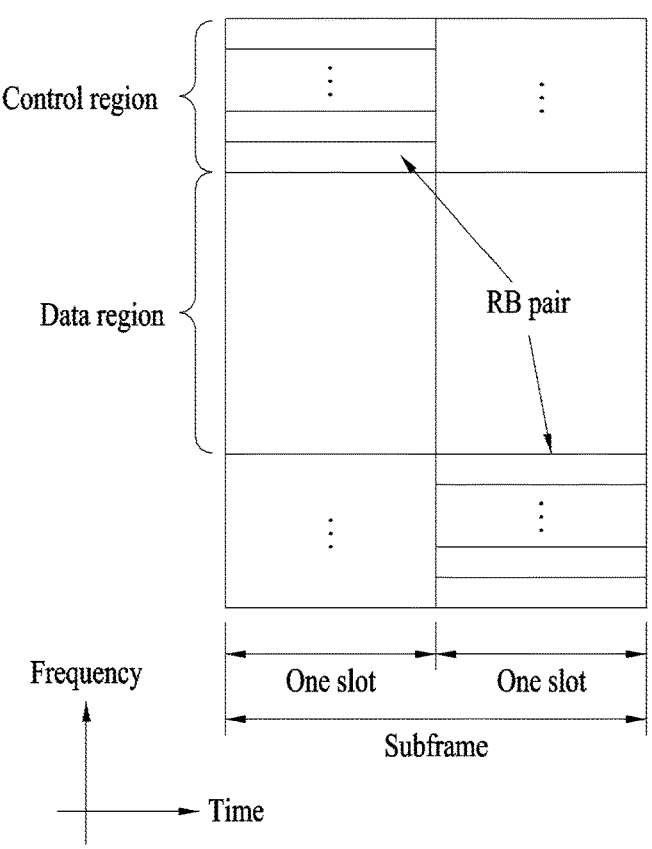
FIG. 4 is a diagram for a structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signals (RSs)

In a wireless communication system, a Packet is transmitted on a radio channel. In view of the nature of the radio channel, the Packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between Transmission (Tx) antennas and Reception (Rx) antennas is required for successful signal reception. Accordingly, an RS should be transmitted through each Tx antenna.

RSs may be divided into downlink RSs and uplink RSs. In the current LTE system, the uplink RSs include:

i) DeModulation-Reference Signal (DM-RS) used for channel estimation for coherent demodulation of information delivered on a PUSCH and a PUCCH; and ii) Sounding Reference Signal (SRS) used for an eNB or a network to measure the quality of an uplink channel in a different frequency.

The downlink RSs are categorized into:

i) Cell-specific Reference Signal (CRS) shared among all UEs of a cell;

ii) UE-specific RS dedicated to a specific UE;

iii) DM-RS used for coherent demodulation of a PDSCH, when the PDSCH is transmitted;

iv) Channel State Information-Reference Signal (CSI-RS) carrying CSI, when downlink DM-RSs are transmitted;

v) Multimedia Broadcast Single Frequency Network (MBSFN) RS used for coherent demodulation of a signal transmitted in MBSFN mode; and vi) positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

Figure 5:
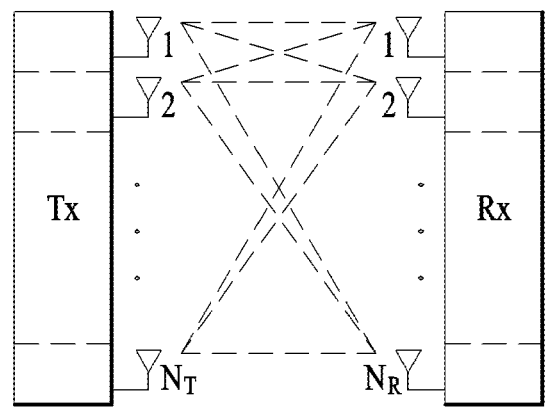
FIG. 5 is a diagram for a configuration of a wireless communication system having multiple antennas.
Figure 5:
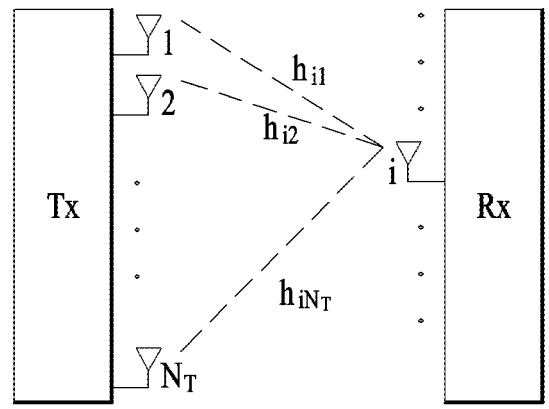

FIG. 5 is a diagram illustrating a configuration of a wireless communication system having multiple antennas.

As shown in FIG. 5(a), if the number of transmit antennas is increased to NT and the number of receive antennas is increased to NR, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \quad \text{[Equation 1]}$$

For instance, in an MIMO communication system, which uses 4 transmit antennas and 4 receive antennas, a transmission rate 4 times higher than that of a single antenna system can be obtained. Since this theoretical capacity increase of the MIMO system has been proved in the middle of 90's, many ongoing efforts are made to various techniques to substantially improve a data transmission rate. In addition, these techniques are already adopted in part as standards for various wireless communications such as 3G mobile communication, next generation wireless LAN and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are NT transmit antennas and NR receive antennas.

Regarding a transmitted signal, if there are NT transmit antennas, the maximum number of pieces of information that can be transmitted is NT. Hence, the transmission information can be represented as shown in Equation 2.

$$s = [s_1, s_2, \ldots, s_{N_T}]^T \quad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2, \ldots, P_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, $\hat{S}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring NT transmitted signals $x_1, x_2, \ldots, x_{N_T}$, which are actually transmitted, by applying weight matrix W to the information vector $\hat{S}$ having the adjusted transmit powers, the weight matrix W serves to appropriately distribute the transmission information to each antenna according to a transport channel state. $x_1, x_2, \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & \vdots & \ddots & \vdots \\ w_{i1} & w_{i2} & \ldots & w_{iN_T} \\ \vdots & \vdots & \ddots & \vdots \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In Equation 5, $w_{ij}$ denotes a weight between an $i^{th}$ transmit antenna and $j^{th}$ information. W is also called a precoding matrix.

If the NR receive antennas are present, respective received signals $y_1, y_2, \ldots, y_{N_R}$ of the antennas can be expressed as follows.

$$y = [y_1, y_2, \ldots, y_{N_R}]^T \quad \text{[Equation 6]}$$

If channels are modeled in the MIMO wireless communication system, the channels may be distinguished according to transmit/receive antenna indexes. A channel from the transmit antenna j to the receive antenna i is denoted by $h_{ij}$.

In $h_{ij}$, it is noted that the indexes of the receive antennas precede the indexes of the transmit antennas in view of the order of indexes.

FIG. 5(b) is a diagram illustrating channels from the NT transmit antennas to the receive antenna i. The channels may be combined and expressed in the form of a vector and a matrix. In FIG. 5(b), the channels from the NT transmit antennas to the receive antenna i can be expressed as follows.

$$h_i^T[h_{i1},h_{i2},\ldots,h_{iN_T}] \quad \text{[Equation 7]}$$

Accordingly, all channels from the NT transmit antennas to the NR receive antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & \vdots & \ddots & \vdots \\ h_{i1} & h_{i2} & \cdots & h_{iN_T} \\ \vdots & \vdots & \ddots & \vdots \\ h_{N_R 1} & h_{N_R 2} & \cdots & h_{N_R N_T} \end{bmatrix} \quad \text{[Equation 8]}$$

An AWGN (Additive White Gaussian Noise) is added to the actual channels after a channel matrix H. The AWGN $n_1$, $n_2$, ..., $n_{N_R}$ respectively added to the NR receive antennas can be expressed as follows.

$$n=[n_1,n_2,\ldots,n_{N_R}]^T \quad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx+n$$

Meanwhile, the number of rows and columns of the channel matrix H indicating the channel state is determined by the number of transmit and receive antennas. The number of rows of the channel matrix H is equal to the number NR of receive antennas and the number of columns thereof is equal to the number NR of transmit antennas. That is, the channel matrix H is an NR×NT matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R) \quad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting Inter-Cell Interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a Synchronization Reference Node (SRN, also referred to as a synchronization source)) may transmit a D2D Synchronization Signal (D2DSS) and the remaining UEs may transmit and receive signals in synchronization with the D2DSS.

Figure 6:
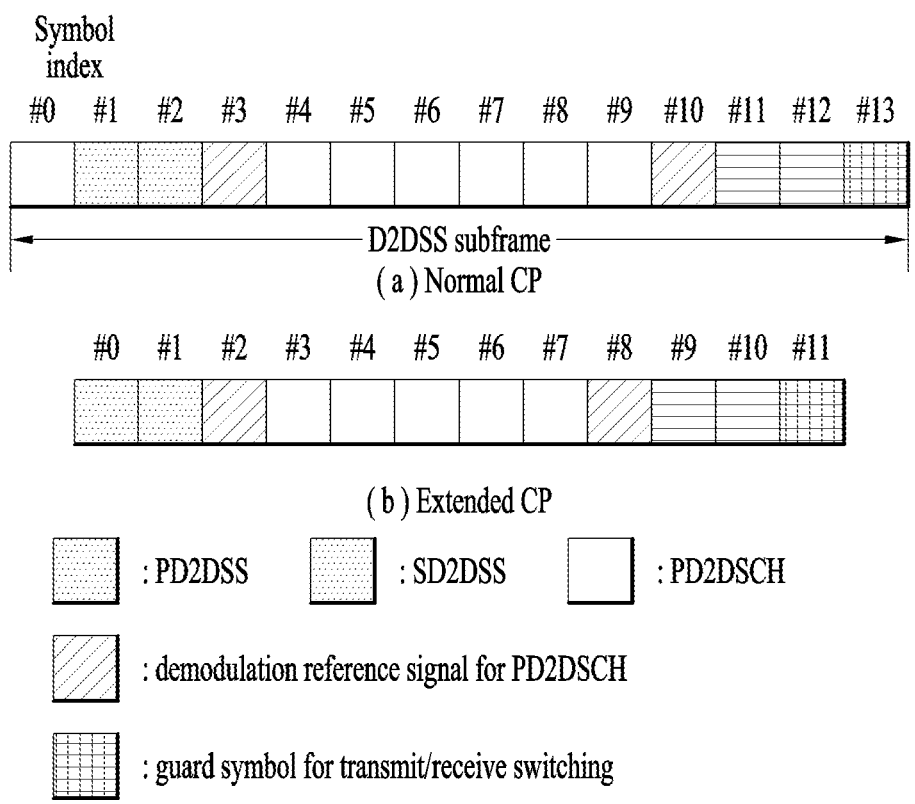
FIG. 6 is a diagram for a subframe in which a D2D synchronization signal is transmitted.

D2DSSs may include a Primary D2DSS (PD2DSS) or a Primary Sidelink Synchronization Signal (PSSS) and a Secondary D2DSS (SD2DSS) or a Secondary Sidelink Synchronization Signal (SSSS). The PD2DSS may be configured to have a similar/modified/repeated structure of a Zadoff-chu sequence of a predetermined length or a Primary Synchronization Signal (PSS). Unlike a DL PSS, the PD2DSS may use a different Zadoff-chu root index (e.g., 26, 37). And, the SD2DSS may be configured to have a similar/modified/repeated structure of an M-sequence or a Secondary Synchronization Signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme. FIG. 6 shows a subframe in which a D2D synchronization signal is transmitted. A Physical D2D Synchronization Channel (PD2DSCH) may be a (broadcast) channel carrying basic (system) information that a UE should first obtain before D2D signal transmission and reception (e.g., D2DSS-related information, a Duplex Mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
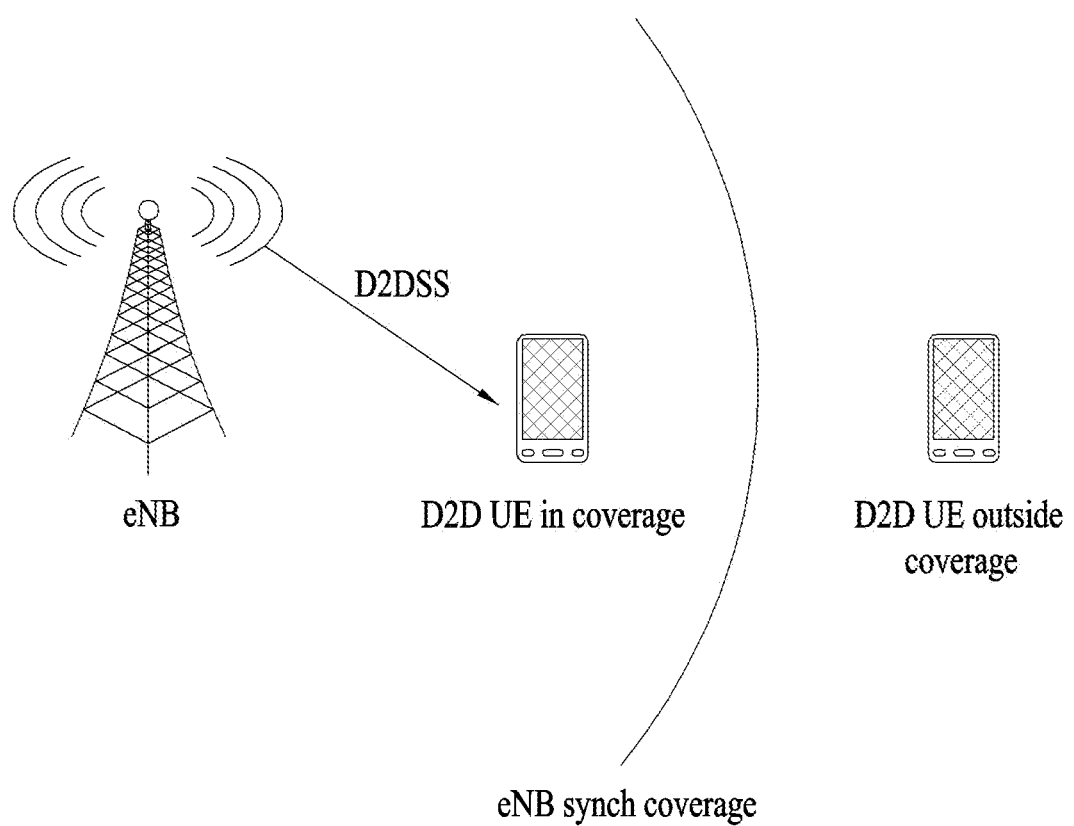
FIG. 7 is a diagram for explaining relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct Amplify-and-Forward (AF)-relay of an SS transmitted by an eNB. As the D2DSS is relayed, an in-coverage UE may communicate directly with an out-of-coverage UE.

D2D Resource Pool

Figure 8:
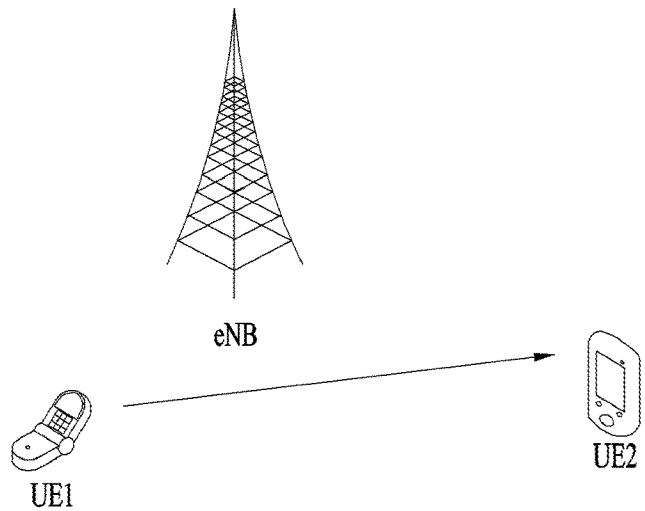
FIG. 8 is a diagram for an example of a D2D resource pool for performing D2D communication.
Figure 8:
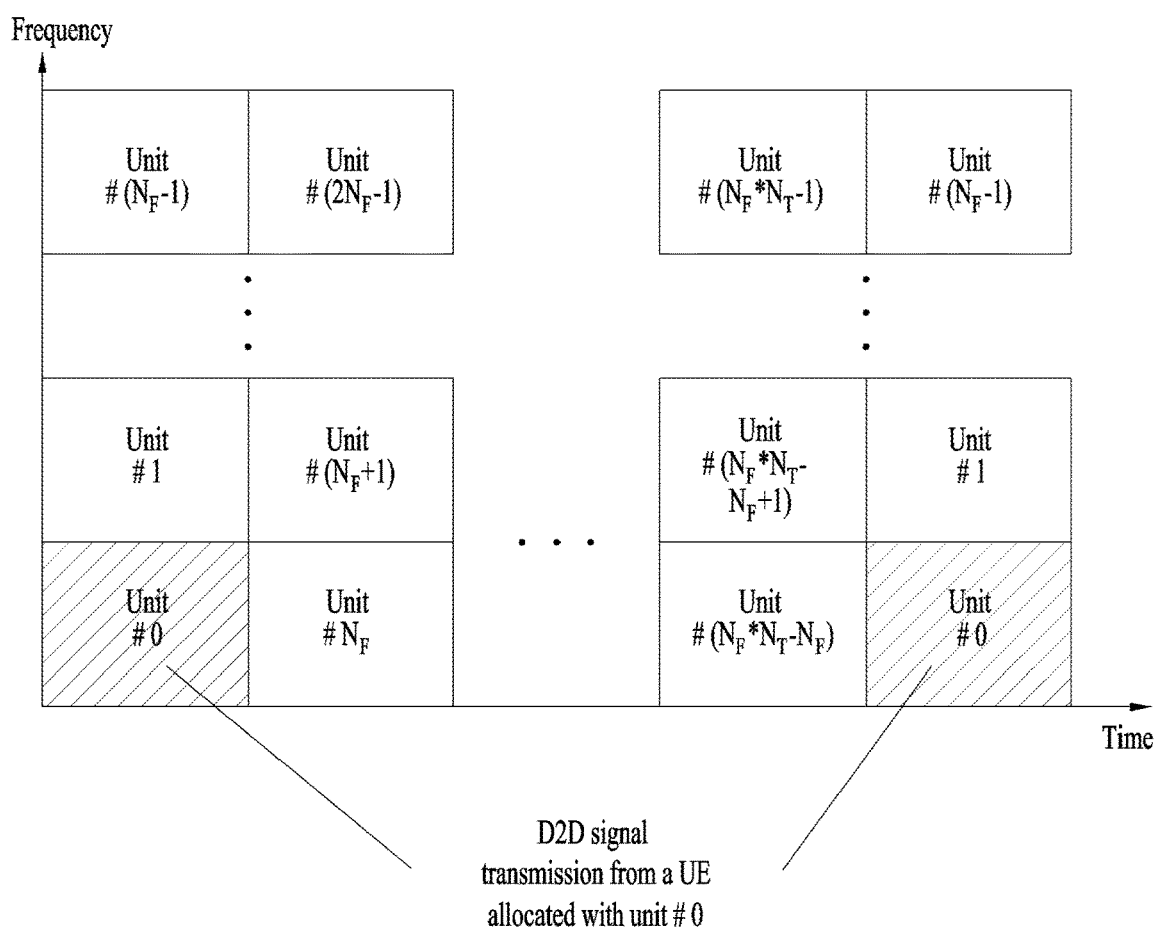

FIG. 8 shows an example of a UE1, a UE2 and a resource pool used by the UE1 and the UE2 performing D2D communication. In FIG. 8 (a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. A UE2 corresponding to a reception UE receives a configuration of a resource pool in which the UE1 is able to transmit a signal and detects a signal of the UE1 in the resource pool. In this case, if the UE1 is located at the inside of coverage of an eNB, the eNB can inform the UE1 of the resource pool. If the UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8 (b) shows an example of configuring a resource unit. Referring to FIG. 8 (b), the entire frequency resources are divided into the $N_F$ number of resource units and the entire time resources are divided into the $N_T$ number of resource units. In particular, it is able to define $N_F * N_T$ number of resource units in total. In particular, a resource pool can be repeated with a period of $N_T$ subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include SA (scheduling assignment), a D2D data channel, and a discovery channel. The SA may correspond to a signal including information on a resource position of a D2D data channel, information on MCS (modulation and coding scheme) necessary for modulating and demodulating a data channel, information on a MIMO transmission scheme, information on TA (timing advance), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a PSCCH (physical sidelink control channel). The D2D data channel (or, PSSCH (physical sidelink shared channel)) corresponds to a resource pool used by a transmission UE to transmit user data. If an SA and a D2D data are transmitted in a manner of being multiplexed in an identical resource unit, D2D data channel except SA information can be transmitted only in a resource pool for the D2D data channel. In other word, resource elements (REs), which are used to transmit SA information in a specific resource unit of an SA resource pool, can also be used for transmitting D2D data in a D2D data channel resource pool. The discovery channel may correspond to a resource pool for a message that enables a neighboring UE to discover transmission UE transmitting information such as ID of the UE, and the like.

Although contents of D2D signal are identical to each other, it may use a different resource pool according to a transmission/reception attribute of the D2D signal. For example, in case of the same D2D data channel or the same discovery message, the D2D data channel or the discovery signal can be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmission UE selects an individual signal transmission resource from a pool), a signal format (e.g., number of symbols occupied by a D2D signal in a subframe, number of subframes used for transmitting a D2D signal), signal strength from an eNB, strength of transmit power of a D2D UE, and the like. For clarity, a method for an eNB to directly designate a transmission resource of a D2D transmission UE is referred to as a mode 1. If a transmission resource region is configured in advance or an eNB designates the transmission resource region and a UE directly selects a transmission resource from the transmission resource region, it is referred to as a mode 2. In case of performing D2D discovery, if an eNB directly indicates a resource, it is referred to as a type 2. If a UE directly selects a transmission resource from a predetermined resource region or a resource region indicated by the eNB, it is referred to as a type 1.

Transmission and Reception of SA

A mode 1 UE can transmit an SA signal (or, a D2D control signal, SCI (sidelink control information)) via a resource configured by an eNB. A mode 2 UE receives a configured resource to be used for D2D transmission. The mode 2 UE can transmit SA by selecting a time frequency resource from the configured resource.

Figure 9:
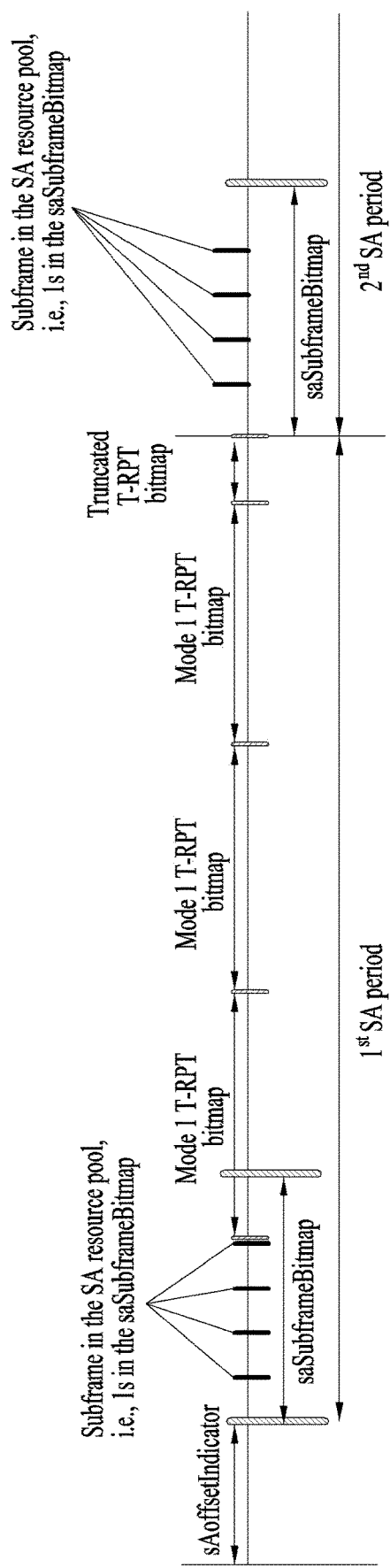
FIG. 9 is a diagram for explaining an SA period.

The SA period can be defined as FIG. 9. Referring to FIG. 9, a first SA period can start at a subframe apart from a specific system frame as much as a prescribed offset (SAOffsetIndicator) indicated by higher layer signaling. Each SA period can include an SA resource pool and a subframe pool for transmitting D2D data. The SA resource pool can include subframes ranging from a first subframe of an SA period to the last subframe among subframes indicated by a subframe bitmap (saSubframeBitmap) to transmit SA. In case of mode 1, T-RPT (time-resource pattern for transmission) is applied to the resource pool for transmitting D2D data to determine a subframe in which an actual data is transmitted. As shown in the drawing, if the number of subframes included in an SA period except the SA resource pool is greater than the number of T-RPT bits, the T-RPT can be repeatedly applied and the lastly applied T-RPT can be applied in a manner of being truncated as many as the number of remaining subframes.

With reference to the above discussion, LTE specification documents, and other well-known technologies, a description will be given of discovery signal transmission, contents included in a discovery signal, selection of a relay using the discovery signal according to embodiments of the present invention. In the following description, a remote UE means a UE that needs to transmit or receive network data to and from a relay UE (or through the relay UE). In addition, if a UE potentially receives assistance from the relay UE even though the UE does not currently receive any services from the relay UE, the UE can be referred to as the remote UE. Such a remote UE may be in or out of coverage.

Reception of Discovery Signal and Selection of Relay Node

According to an embodiment of the present invention, a D2D UE can receive a plurality of discovery signals and select a relay using qualities of the plurality of discovery signals and a synchronization signal source ID (or a sidelink synchronization source ID (SSID)). Here, the use of the discovery signal qualities and synchronization signal source ID may mean that although a relay is selected in descending order of the discovery signal qualities but the relay does not belong to the same synchronization cluster (here, a synchronization cluster means a group of UEs that transmit D2D synchronization (synch) signals using the same eNB as a timing reference), the relay is not selected. In other words, a relay is selected in descending order of the discovery signal qualities. However, if the selected relay has a synchronization signal source ID different from that of the UE, the relay can be considered to have the lowest quality. For example, referring to FIG. 10, the UE receives discovery signals from the relay UE A and relay UE B. In this case, if the relay UE B is closer to the UE, and thus a signal quality of the relay UE B is better than that of the relay UE A, the relay UE A can be selected as a relay instead of the relay UE B with the better signal quality because the relay UE B and UE belong to different synchronization clusters.

Although an RSRP can be used to indicate a signal quality, the present invention is not limited thereto. That is, an RSRQ, RSSI, and the like can also be used. The relay selection is performed only in a discovery resource pool associated with a synchronization source with the maximum RSRP. That is, discovery signals transmitted from relay UEs belonging to the selected synchronization source are received only. Thereafter, DMRSs of the relay discovery UEs are measured, and the relay selection is performed.

Figure 10:
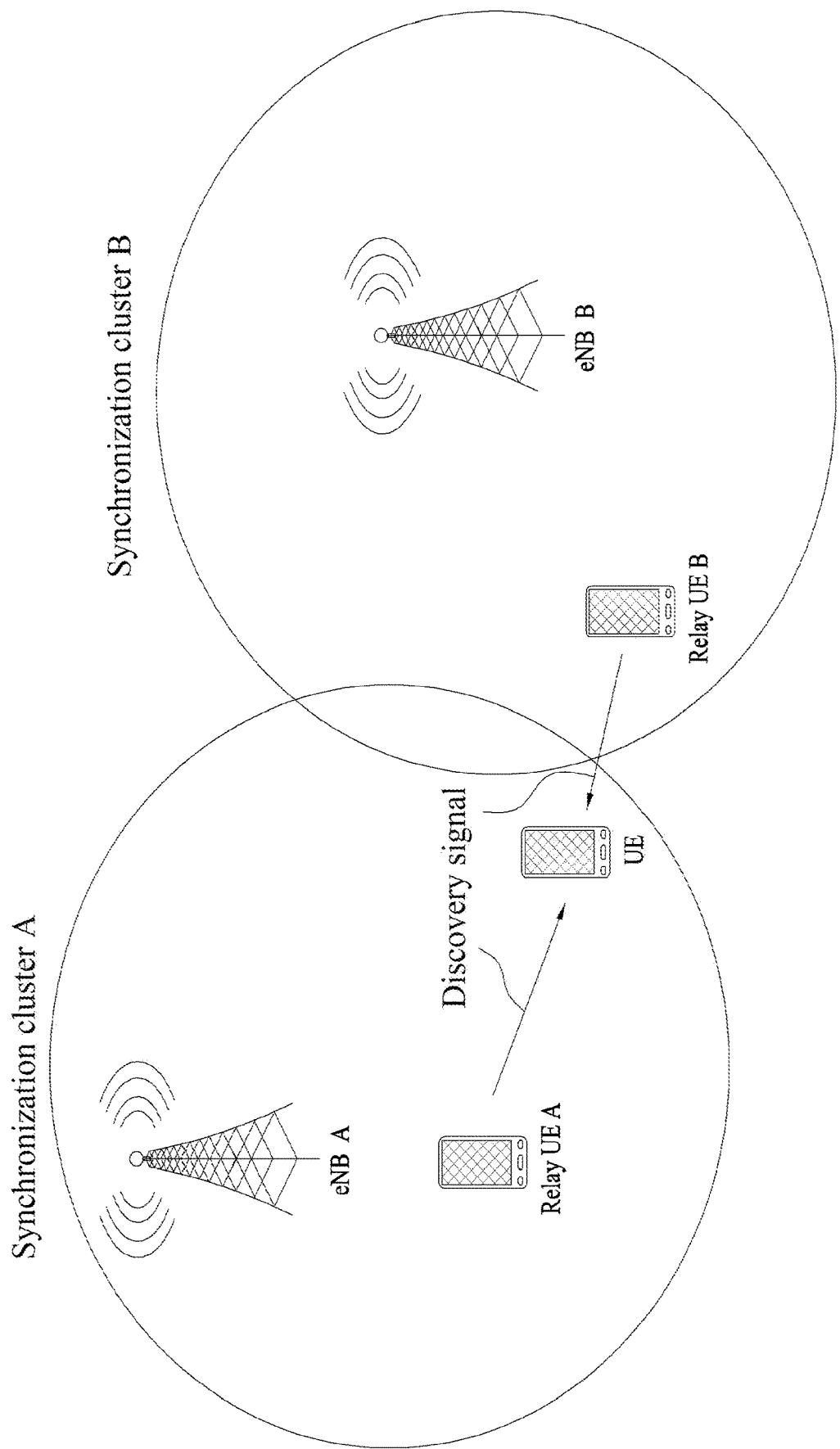
FIG. 10 is a diagram for explaining an embodiment of the present invention.

If the remote UE selects a relay UE (e.g., relay UE B in FIG. 10) belonging to a different synchronization cluster (e.g., synchronization cluster B when a synchronization source with the best synchronization signal quality (best S-RSRP) is eNB A) instead of one with the best S-RSRP, the corresponding remote UE (e.g., UE in FIG. 10) requires a long time for synchronization signal reception to receive a signal from the relay UE (e.g., relay UE B in FIG. 10). This is because, according to LTE release 12, since only a synchronization subframe of the selected synchronization source is unoccupied, synchronization signals from other synchronization sources should be received in a best effort manner. That is, this problem can be solved by applying an embodiment of the present invention. In addition, if the remote UE selects a different synchronization source rather than the best S-RSRP and then transmits a signal with reference to timing of the corresponding synchronization source, inter-carrier interference may occur because the timing is different from that of UEs in a synchronization cluster with the best S-RSRP. However, this problem can also be solved by the above embodiment. That is, the above-described embodiment has an advantage in that even when a relay UE that is more suitable for discovery measurement is present in a different synchronization cluster, the relay UE is not selected and thus, the corresponding remote UE does not cause ICI to other D2D UEs belonging to its synchronization cluster.

As another method for selecting a relay, when a remote UE observes a plurality of synchronization clusters, relay UEs in synchronization clusters having S-RSRPs within a predetermined threshold from the best S-RSRP or relay UEs in synchronization clusters having upper N S-RSRPs selected in descending order from the best S-RSRP can be included in relay selection candidates. The remote UE performs the discovery measurement on discovery signals associated with the best S-RSRP and discovery signals associated with synchronization clusters having remaining priority S-RSRPs. Thereafter, the remote UE performs the relay selection from among relay UEs that transmit discovery signals in the corresponding synchronization clusters. In this case, a threshold value of the S-RSRP or a ratio of the S-RSRP to the best S-RSRP can be predefined or configured by the network.

As a further method, when a remote UE observes a plurality of synchronization clusters, the remote UE may perform the discovery measurement for relay UEs included in a synchronization cluster with an S-RSRP equal to the best S-RSRP and synchronization clusters having timing difference within a predetermined threshold from the best S-RSRP synchronization cluster and then perform the relay selection from among the relay UEs. The reason for this is to prevent the amount of the ICI from increasing by including relay UEs in synchronization clusters having timing slightly different from that of the best S-RSRP synchronization cluster as relay selection candidates even when a non-best synchronization cluster is selected. In this case, timing offset between a synchronization cluster to be included as the relay selectin candidate and the best S-RSRP synchronization cluster can be predefined or configured by the network.

After selecting a relay according to the above-described methods, a UE can receive a D2D signal from the selected relay.

Information that can be Included in Discovery Signal

In the above description, the synchronization signal source ID can be used to determine whether synchronization clusters are equal to each other, and this synchronization signal source ID may be included in the discovery signal. That is, a plurality of discovery signals can respectively include synchronization signal source IDs of relays. In other words, an SLSS ID used by a relay UE in the corresponding cell or an out-coverage D2D UE is transmitted. After receiving the SLSS ID, a UE can confirm an ID of a D2D synchronization signal corresponding to a timing reference of the discovery signal received by itself, and by doing so, the UE can select the synchronization source.

In addition, each of the plurality of discovery signals can include resource pool information. In this case, the UE may attempt to receive data on resources indicated by resource pool information. Specifically, resource pool information that is currently used (or will be used) by a relay or remote UE for D2D data transmission may be included (in the discovery signal) and then transmitted. The resource pool information may be information on a pool currently used to transmit the discovery signal or information on a resource pool for performing D2D communication. This information may include particular information such as a pool bitmap, the number of bitmap repetitions, offset, etc. Alternatively, a pool index may be simply included and then transmitted. If one resource pool is divided into a plurality of sub-pools, information on the sub-pools may be transmitted together. If a relay UE performs transmission on resource pool #1, a remote UE may attempt to receive data relayed through the corresponding pool. In addition, the remote UE may attempt transmission through another pool except the pool used by the relay UE based on this information. This is because since when the relay UE simultaneously supports multiple remote UE groups, the relay UE may not correctly receive a signal from a certain remote UE due to small reception opportunities in a specific pool. In this case, the remote UE can allow the relay UE to receive a signal by selecting another pool.

Additionally, each of the plurality of discovery signals can include transmit (Tx) power information of a relay UE that transmits a corresponding discovery signal. A UE can estimate a path loss using this Tx power information. In this case, power information currently used by a relay UE or remote UE for transmission can be included and then transmitted. After measuring the path loss (PL) based on the above-described information, a receiving UE can use the measured PL for power control between D2D links. OLPC can be applied to a relay UE as an in-coverage UE, and in this case, a D2D receiving UE may not be aware of actual Tx power. If the Tx power information is included in a discovery message, the receiving UE can estimate the PL. If the discovery message is transmitted in response to a different specific discovery message, a measurement result (or CSI) when the different discovery message is received may be transmitted. For example, if a remote UE transmits a D2D signal in response to a discovery message from a relay UE, a measurement value (or a CSI value) of a D2D link, which is measured by the remote UE, can be included and then transmitted. This may become efficient when D2D UEs use different resources for transmission and reception. For example, if a remote UE and a relay UE perform transmission using different bands or frequency resources and a receiver measures link quality or strength and reports the measurement link quality or strength, it may be helpful for a transmitter to understand a channel state and determine an MCS and Tx power.

Additionally, each of the plurality of discovery signals can include mobility information of a relay UE that transmits a corresponding discovery signal. A UE may decrease priority of a relay UE with high mobility using the mobility information. That is, mobility information of a relay UE or remote UE may be included in the discovery signal and then transmitted. This information may be expressed as a UE's movement speed or simply included as an N-bit status. For example, the mobility information can be expressed as 1-bit information. Specifically, when a UE moves with a speed equal to lower than a predetermined speed, a related field can be set to 0. On the other hand, when a UE moves with a speed greater than the predetermined speed, the field can be set to 1. After receiving this, the remote UE may de-prioritize a relay UE with high mobility in relay node selection because a connection with the relay UE with high mobility is likely to be disconnected.

Additionally, each of the plurality of discovery signals can include handover-related information of a UE that transmits a corresponding discovery signal. Using the handover-related information, a UE may detect a synchronization signal of a cell to which a relay UE will be handed over. That is, the discovery signal may include information on a target cell for handover and/or information on an SLSS ID of a target cell. If the relay UE is moving and intends to perform handover, the relay UE can transmit information on a cell ID and SLSS ID of a target cell to which the relay UE will be handed over by including the information in a discovery message. After receiving the discovery message, the remote UE can know that the corresponding relay UE will move and then detect SLSS of the corresponding cell. By doing so, the remote UE can reduce delay caused by SLSS reception.

Additionally, the discovery signal can include cell ID information. A relay UE can transmit a cell ID of the cell to which the corresponding relay UE belongs in order to allow in-coverage remote UEs to preferentially select a relay UE in the same cell.

Additionally, the discovery signal can include information on a moving direction and speed of a UE. As a particular version of the mobility information, this information may include the UE's moving direction and the speed in the corresponding direction. A UE that receives this information can calculate a relative speed between two UEs using its moving direction and speed and utilize the relative speed for relay selection. For example, if a moving direction and speed of a specific UE is equal to those of the corresponding UE, the relative speed therebetween becomes zero. Thus, the UE can continuously receive services from the corresponding relay UE.

Additionally, the discovery signal can include whether a UE is in coverage. A remote UE may include its coverage state in a discovery message and then transmit the discovery message. For example, a coverage indicator field may be included in the discovery message. This coverage indicator can be expressed as 1 bit or N bits, and it can be differently represented according to signal strength of an eNB. After receiving this coverage indicator, a relay UE can be aware of the coverage state of the remote UE and then modify a relay path setup operation.

Additionally, the discovery signal can include carrier information. When a relay or remote UE operate on multiple component carriers and a carrier used for transmitting and receiving actual data is different from that for transmitting and receiving current discovery, information on the carrier for data transmission or reception can be included in a discovery message.

Additionally, the discovery signal can include whether a UE is a rode side unit (RSU). In an V2X environment where the RSU is installed, the RSU needs to be distinguished from other relays. For example, specific data needs to be relayed through the RSU for stabilization. In this case, an RSU indicator may be included in the discovery message and thus, the RSU can be used for relay selection. Alternatively, the RSU may be configured to be selected with higher priority than other relays.

Additionally, the discovery signal can include position information. In V2X, a vehicle may accurately know its position information through various sensors. In this case, the vehicle may include its position information in the discovery message and then transmit the discovery message. Thus, after receiving the discovery message, a UE can use the position information when performing operation later. For example, when a specific UE obtains position information included in the discovery message, the UE may perform relay selection or operation for a specific service/application based on the position information.

Additionally, the discovery signal can include a discovery type, a type-related parameter, discovery pool information, and related parameters. If Type 1 discovery is allowed in an out-coverage scenario, resource pools to be used by out-coverage UEs should be defined. For example, N resource pools may be pre-configured for the out-coverage UEs. In this case, a resource pool transmitted by an in-coverage UE should be aligned with one of the resource pools received by the out-coverage UEs in order for the out-coverage UEs to receive a discovery signal from the in-coverage UE. In order for the out-coverage UEs to receive D2D signals from an adjacent unsynchronized network, a sufficient number of reception pools should be pre-configured. For example, according to LTE release 12, the in-coverage UE may receive information on up to 15 neighboring cell pools and receive discovery signals from other cells using the information. Likewise, for the out-coverage UEs, up to 15 pre-configured repetition (resource) pools may be configured.

Meanwhile, signaling indicating which discovery type and discovery pool are used for transmission may be required. Discovery type information and/or corresponding pool information (transmitted pool index and/or all or some of relevant pool information) may be included in a PSBCH transmitted by a discovery UE and then transmitted.

Additionally, discovery repetition information can be included in the discovery signal. For in-coverage UEs, the network may configure a discovery repetition number. In this case, since out-coverage UEs may not know which repetition number is used by the in-coverage UEs, the repetition number used by the in-coverage UEs can be included in the PSBCH or discovery message and then transmitted. In the case of the PSBCH, the repetition number may be designated by utilizing reserved bits of PSBCHs transmitted by discovery UEs.

Additionally, the discovery signal may include information related to Type 2B related parameters. Meanwhile, when Type 2B hopping is used, information on a corresponding pool (Nt, Nt) and/or some or all of hopping parameter Type 2B discovery hopping parameter a, Type 2B discovery hopping parameter b Dash, Type 2B discovery hopping parameter c of the corresponding pool may be included in the discovery message or the PSBCH transmitted by the discovery UE. If this value is known, a UE can perform measurement at the corresponding location, and thus, measurement accuracy can be improved.

Additionally, the discovery signal can include CP length information. Information on a CP length used in the discovery pool may be included in the PSBCH transmitted from the discovery UE and then transmitted.

Additionally, the discovery signal can include a communication mode and related parameter. According to Rel-12, in mode 1, a single SA pool is configured in each cell and in mode 2, up to four pools may be configured. In this case, out-coverage UEs should know which pool is used by an in-coverage UE to perform reception by configuring a DMRS, scrambling sequence, and the like according to a subframe index of the corresponding pool. Thus, information indicating which resource pool is used or which mode is used may be included in the discovery message and then transmitted. For example, when the in-coverage UE uses the mode 1, corresponding mode information and/or mode 1 SA pool information may be included in the discovery message and then transmitted. When the mode 2 is used, an indicator indicating that the mode 2 is used and/or a mode 2 pool index and/or information on the used mode 2 pool may be included and then transmitted. In addition, some or all of a hopping flag of the corresponding pool, a frequency hopping type, a parameter used for type 2 PUSCH frequency hopping (the number of subbands, hopping ID, hopping offset, etc.) may be included in the discovery message or PSBCH and then transmitted.

Additionally, a CP length used in the corresponding pool may be included in the discovery message or PSBCH and then transmitted.

Meanwhile, communication pool information can be determined by being interconnected with discovery pool information. For example, it may be predefined that a relay UE using discovery pool # n will be use communication pool # n. Alternatively, it may be signaled through the discovery message or a different separate D2D channel/signal/packet. The reason for this is to not only reduce the burden of performing a blind search over all pools due to an unknown communication pool even when a relay UE has been found through the discovery but also utilize measurement for the discovery pool in terms of communication by configuring a pool with an interference environment similar to that of the discovery.

Additionally, the discovery signal can include information indicating whether the relay UE is RRC-connected or not. When a relay-capable UE in an RRC idle state transmits a relay discovery message, the UE may include the current RRC state in the discovery message and then transmit the message. In this case, the remote UE may preferentially select a relay in an RRC connected mode or expect that the relay in the idle state may cause delay while it switches to the RRC connected state. Similarly, an RRC connected state of the remote UE can be included in the discovery message and then transmitted. The relay UE can distinguish between a case in which the remote UE is in a cell edge but can maintain the RRC connection and a case in which the remote UE moves out of a cell and thus is not in the RRC connected state. Thereafter, a relay path configuration operation can be changed.

Further, a method of including the RRC connected state of the relay UE in the discovery message can be extended, and thus, the discovery message may include fields indicating some or all of the following state information: 'the relay UE is relaying', 'the relay UE is relaying for N or more destination groups or N or fewer destination groups', 'the relay UE can operate as a relay immediately or within a predetermined time', 'the relay UE is configured to operate as a relay by an eNB (through dedicated signaling)', 'the relay UE is a relay candidate', 'the relay UE has satisfied the conditions for becoming a relay, which are configured by an eNB', 'RSRP and/or RSRQ is lower than a predetermined threshold', and 'RSRP and/or RSRQ is equal to or higher than a predetermined threshold but lower than another predetermined threshold'. Based on the above state information, a network may establish conditions for an RRC idle UE to become a relay. For example, among relay-capable or prose (proximity service) enable (capable) UEs, a UE with RSRP/RSRQ lower than a predetermined threshold (or RSRP and/or RSRQ equal to or higher than a predetermined threshold but lower than another predetermined threshold) may become a relay candidate UE. In this case, the network may signal to relay UEs the conditions for becoming the relay through a physical layer signal or higher layer signal. If there is a UE satisfying the conditions, the UE can transmit an indicator indicating that the corresponding UE satisfies the conditions for becoming the relay when transmitting the discovery message. In addition, if the eNB directly configures the relay, it may have priority over the case in which the conditions for becoming the relay are met. For example, when both a relay UE directly configured by the eNB and a relay UE satisfying the conditions for becoming the relay are simultaneously discovered, the relay UE directly configured by the eNB can be preferentially selected.

For some or all of the proposed contents, pre-configured values can be used. Specifically, if the eNB knows that out-coverage UEs are present nearby or if the eNB manages the relay UE, the eNB can set related parameters to the pre-configured values for the out-coverage UEs, and thus, relay UEs or in-coverage UEs can transmit D2D signals.

The above description can relate to contents of the discovery signal transmitted from the relay or remote UE in D2D communication or V2X communication. Although the aforementioned contents are assumed to be included in the discovery signal and then transmitted, these contents can be transmitted through a D2D discovery channel or a D2D communication channel. The former case can be referred to as a discovery-through-discovery (DTD) scheme, and the latter case can be referred to as discovery-through-communication (DTC) scheme. Moreover, the above description is not limited to a physical channel format in which the discovery message is transmitted, and it can be transmitted through a third D2D physical layer channel (e.g., PSBCH).

Since each of the examples of the aforementioned proposed methods can be also included as one of methods for implementing the present invention, it is apparent that each of the examples can be regarded as a proposed method. In addition, it may be able to implement each of the proposed methods not only independently but also by combining (or merging) some of the proposed methods. In addition, a rule may be defined such that an eNB informs a UE whether the proposed methods are applied (or information on rules for the proposed methods) through predefined signal (e.g., a physical layer signal or higher layer signal).

Device Configurations According to the Embodiments of the Present Invention

FIG. 11 is a diagram illustrating configurations of a transmission point device and a user equipment device according to embodiments of the present invention.

Referring to FIG. 11, a transmission point device 10 according to the present invention may include a receiving device 11, a transmitting device 12, a processor 13, a memory 14 and a plurality of antennas 15. The plurality of the antennas 15 may mean that the transmission point device supports MIMO transmission and reception. The receiving device 11 can receive various signals, data and information in uplink from a user equipment. The transmitting device 12 can transmit various signals, data and information in downlink to the user equipment. In addition, the processor 13 can control overall operation of the transmission point device 10.

The processor 13 of the transmission point device 10 performs functions of operating and processing information received by the transmission point device 10, information to be externally transmitted by the transmission point device 10, and the like. The memory 14 can store the operated and processed information and the like for a prescribed period and can be substituted with such a component as a buffer (not shown in the drawing) and the like.

Referring to FIG. 11, a UE device 20 according to the present invention may include a receiving device 21, a transmitting device 22, a processor 23, a memory 24 and a plurality of antennas 25. The plurality of the antennas 25 may mean that the UE device supports MIMO transmission and reception. The receiving device 21 can receive various signals, data and information in downlink from a BS. The transmitting device 22 can transmit various signals, data and information in uplink to the BS. In addition, the processor 23 can control overall operation of the UE device 20.

The processor 23 of the UE device 20 according to one embodiment of the present invention can handle the details required in each of the aforementioned embodiments.

The processor 23 of the UE device 20 performs functions of operating and processing information received by the UE device 20, information to be externally transmitted by the UE device 20, and the like. The memory 24 can store the operated and processed information and the like for a prescribed period and can be substituted with such a component as a buffer (not shown in the drawing) and the like.

The detailed configurations of the transmission point device 10 and the UE device 20 can be implemented such that the details explained with reference to various embodiments of the present invention are independently applied or two or more embodiments of the present invention are simultaneously applied. Here, redundant description shall be omitted for clarity.

The description of the transmission point device 10 in FIG. 11 may be equally applied to a relay node device as a downlink transmission entity or an uplink reception entity. And, the description of the UE device 20 in FIG. 11 may be equally applied to a relay node device as a downlink reception entity or an uplink transmission entity.

The embodiments of the present invention mentioned in the foregoing description can be implemented using various means. For instance, the embodiments of the present invention can be implemented using hardware, firmware, software and/or any combinations thereof.

In the case of implementation by hardware, a method according to each of the embodiments of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In the case of implementation by firmware or software, a method according to each of the embodiments of the present invention can be implemented by modules, procedures, and/or functions for performing the above-explained functions or operations. The software code is stored in a memory unit and can be driven by a processor. The memory unit is provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. For instance, the respective configurations disclosed in the aforesaid embodiments of the present invention can be used by those skilled in the art in a manner of being combined with one another. Therefore, the present invention is non-limited by the embodiments disclosed herein but intends to give a broadest scope matching the principles and new features disclosed herein.

It will be apparent to those skilled in the art that the present invention may be embodied in other specific forms without departing from the spirit and essential characteristics of the invention. Thus, the above embodiments should be considered in all respects as exemplary and not restrictive. The scope of the present invention should be determined by reasonable interpretation of the appended claims and the present invention covers the modifications and variations of this invention that come within the scope of the appended claims and their equivalents. The present invention is non-limited by the embodiments disclosed herein but intends to give a broadest scope that matches the principles and new features disclosed herein. And, it is apparently understandable that an embodiment is configured by combining claims failing to have relation of explicit citation in the appended claims together or can be included as new claims by amendment after filing an application.

INDUSTRIAL APPLICABILITY

The above-described embodiments of the present invention can be applied to various mobile communication systems.

What is claimed is:

1. A method for selecting a relay for device-to-device (D2D) communication and receiving a signal by a user equipment (UE) in a wireless communication system, the method comprising:
   determining a discovery resource pool related to a synchronization source having a best quality among a plurality of synchronization sources;
   receiving a plurality of discovery signals only in the determined discovery resource pool;
   selecting a relay based on qualities of the plurality of discovery signals; and
   receiving a D2D signal from the selected relay.

2. The method of claim 1, wherein each of the plurality of discovery signals includes a synchronization signal source ID of a relay.

3. The method of claim 1, wherein each of the plurality of discovery signals includes resource pool information.

4. The method of claim 3, wherein the UE attempts to receive data on resources indicated by the resource pool information.

5. The method of claim 1, wherein each of the plurality of discovery signals includes transmit power information of a relay UE that transmits a discovery signal.

6. The method of claim 5, wherein the UE estimates a path loss using the transmit power information.

7. The method of claim 1, wherein each of the plurality of discovery signals includes mobility information of a relay UE that transmits a discovery signal.

8. The method of claim 7, wherein the UE de-prioritizes a relay UE with high mobility using the mobility information.

9. The method of claim 1, wherein each of the plurality of discovery signals includes handover-related information of a relay UE that transmits a discovery signal.

10. The method of claim 9, wherein the UE detects a synchronization signal of a cell to which a relay intends to perform handover.

11. A device-to-device (D2D) user equipment (UE) for selecting a relay and receiving a signal in a wireless communication system, the D2D UE comprising:
   a transmitter;
   a receiver; and
   a processor,
   wherein the processor is configured to:
   determine a discovery resource pool related to a synchronization source having a best quality among a plurality of synchronization sources,
   control the receiver to receive a plurality of discovery signals only in the determined discovery resource pool,
   select a relay based on qualities of the plurality of discovery signals, and
   control the receiver to receive a D2D signal from the selected relay.

* * * * *